US009753996B2

(12) United States Patent
Kazoun et al.

(10) Patent No.: US 9,753,996 B2
(45) Date of Patent: Sep. 5, 2017

(54) APPARATUS, METHOD AND COMPUTER READABLE MEDIUM FOR SIMULATION INTEGRATION

(75) Inventors: Chafic Kazoun, Washington, DC (US); Samuel Neff, Rockville, MD (US)

(73) Assignee: ATELLIS, INC., Washington, DC (US)

( * ) Notice: Subject to any disclaimer, the term of this patent is extended or adjusted under 35 U.S.C. 154(b) by 319 days.

(21) Appl. No.: 12/950,580

(22) Filed: Nov. 19, 2010

(65) Prior Publication Data

US 2011/0119317 A1   May 19, 2011

Related U.S. Application Data

(60) Provisional application No. 61/262,794, filed on Nov. 19, 2009.

(51) Int. Cl.
G06F 17/30  (2006.01)

(52) U.S. Cl.
CPC .............................. *G06F 17/30569* (2013.01)

(58) Field of Classification Search
CPC  G09B 23/28; G06F 19/3437; G06F 17/30569
USPC .......................... 707/809, 999.101; 434/262
See application file for complete search history.

(56) References Cited

U.S. PATENT DOCUMENTS

| | | | | |
|---|---|---|---|---|
| 5,835,789 A * | 11/1998 | Ueda et al. | ...................... | 710/33 |
| 6,503,087 B1 * | 1/2003 | Eggert et al. | ................. | 434/262 |
| 7,055,095 B1 * | 5/2006 | Anwar | .......................... | 715/206 |
| 8,162,668 B2 * | 4/2012 | Toly | ............................... | 434/267 |
| 8,323,032 B2 * | 12/2012 | Deering | ........................ | 434/273 |
| 2002/0045152 A1 * | 4/2002 | Viscardi et al. | ............... | 434/219 |
| 2004/0177160 A1 * | 9/2004 | Seto | ................... | G06F 17/30914 709/246 |
| 2005/0066002 A1 * | 3/2005 | Teres | .................... | G06F 19/321 709/204 |
| 2006/0265205 A1 | 11/2006 | Weiss et al. | | |
| 2007/0055488 A1 | 3/2007 | Elez | | |
| 2007/0055543 A1 | 3/2007 | Knapp | | |
| 2007/0111174 A1 * | 5/2007 | Kozmenko et al. | .......... | 434/262 |
| 2007/0159962 A1 | 7/2007 | Mathavu et al. | | |
| 2008/0124694 A1 * | 5/2008 | Miller et al. | ................... | 434/262 |
| 2008/0145829 A1 * | 6/2008 | Huang | ..................... | G09B 9/00 434/308 |
| 2009/0037855 A1 | 2/2009 | Tanefusa et al. | | |
| 2009/0327511 A1 * | 12/2009 | Kim et al. | .................... | 709/232 |

(Continued)

OTHER PUBLICATIONS

Nabil Zary et al, "Development, implementation and pilot evaluation of a Web-based Virtual Patient Case Simulation environment—Web-SP", Feb. 21, 2006.*

(Continued)

*Primary Examiner* — Dinku Gebresenbet
(74) *Attorney, Agent, or Firm* — Sughrue Mion, PLLC

(57) ABSTRACT

A method and a system of standardizing data from devices such as medical simulators. The method includes receiving data from a device, determining by a computer type of information provided in the received data, converting the information into a predetermined format based on the determined type and generating a message based on the determined type, the message comprising the converted information in the predetermined format. In this method, type of the information is different based on a stage of a process in which the received data was provided.

31 Claims, 11 Drawing Sheets

(56) References Cited

U.S. PATENT DOCUMENTS

2010/0121879 A1* 5/2010 Greenberg ........ G06F 17/30554
                                                        707/779
2010/0159434 A1* 6/2010 Lampotang et al. ......... 434/365
2010/0167252 A1* 7/2010 Miller ........................... 434/267
2011/0144967 A1* 6/2011 Adirovich ...................... 703/11
2011/0223573 A1* 9/2011 Miller et al. .................. 434/267
2014/0214552 A1* 7/2014 Stivoric et al. ............. 705/14.67

OTHER PUBLICATIONS

International Search Report and Written Opinion for PCT/US2010/057349 mailed on Jun. 24, 2011.

* cited by examiner

FIG. 5A

```
<report>
    <image id="cf124d7b16804050bdb1e84352fe4b2f" format="jpg" />
    <group text="List of countries by population3">
        <result text="result1" patTime="0" value="10" />
        <result text="result1" patTime="0" value="20" correct="True" />
        <result text="result1" patTime="0" value="30" grade="3" />
        <result text="result1" patTime="0" value="40" correct="False" grade="2" />
        <result text="result1" patTime="0" value="40" correct="False" grade="8" />
        imageRef="cf124d7b16804050bdb1e84352fe4b2f" />
    </group>
    <table text="HUMAN CASES OF BIRD FLU1">
        <col text="Country" />
        <col text="Cases" />
        <col text="Deaths" />
        <row text="Azerbaijan">
            <result text="-" patTime="0" value="7" />
            <result text="-" patTime="0" value="3" />
        </row>
        <row text="Cambodia">
            <result text="-" patTime="0" value="1" />
            <result text="-" patTime="0" value="8" />
        </row>
        <row text="China">
            <result text="-" patTime="0" value="3" />
            <result text="-" patTime="0" value="6" />
        </row>
    </table>
    <group text="List of countries by area7">
        <result text="result2" patTime="0" value="10" />
        <result text="result2" patTime="0" value="20" correct="True" />
        <result text="result2" patTime="0" value="30" grade="7" />
        <result text="result2" patTime="0" value="40" correct="False" grade="8" />
        <result text="result2" patTime="0" value="40" correct="False" grade="2" />
        imageRef="cf124d7b16804050bdb1e84352fe4b2f" />
    </group>
</report>
```

FIG. 5B

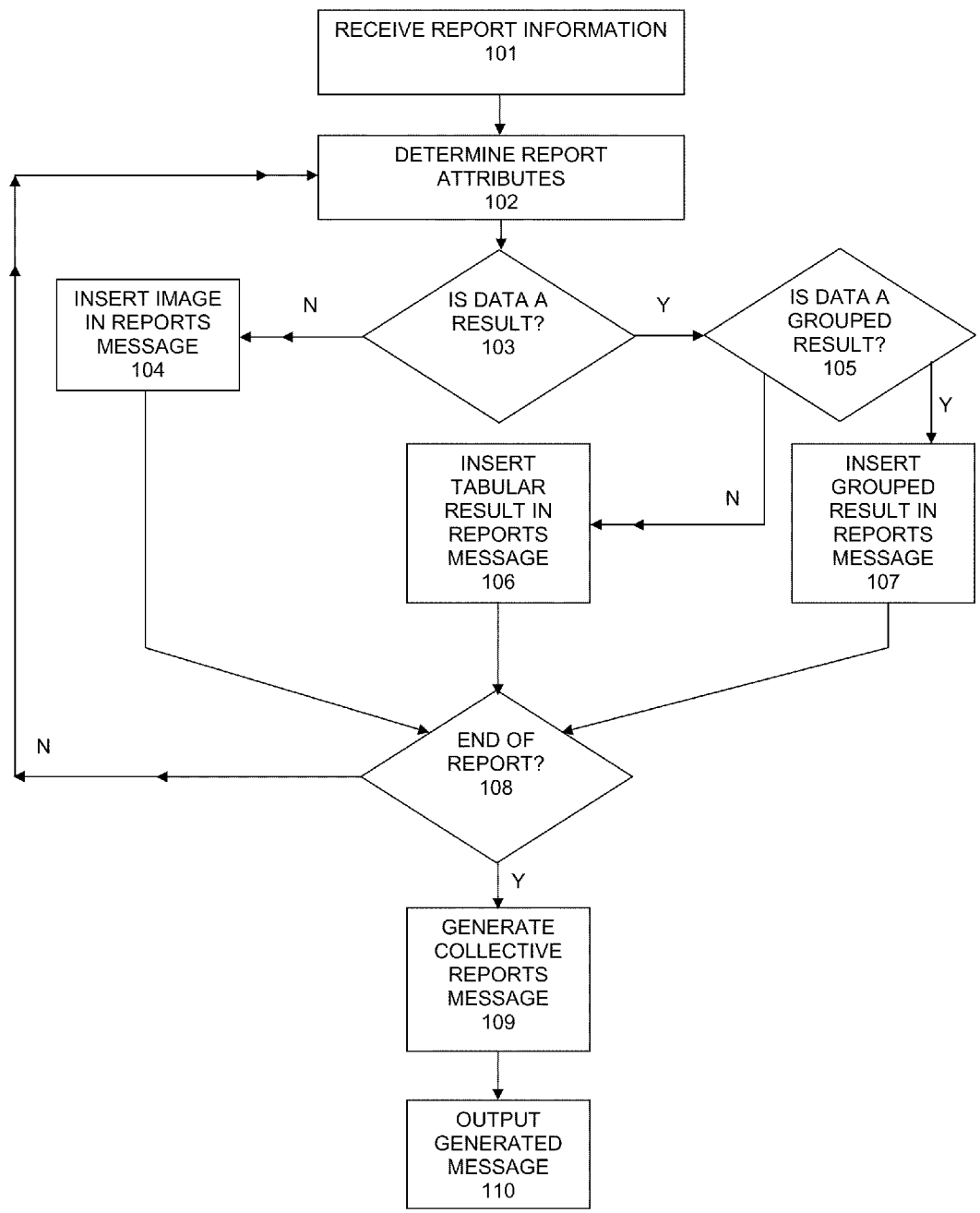

APPARATUS, METHOD AND COMPUTER READABLE MEDIUM FOR SIMULATION INTEGRATION

CROSS-REFERENCE TO RELATED APPLICATION

This application claims benefit pursuant to 35 U.S.C. §120 of the filing date of the Provisional Application Ser. No. 61/262,794 filed on Nov. 19, 2009 and titled "APPARATUS, METHOD, AND COMPUTER READABLE MEDIUM FOR SIMULATION INTEGRATION," which is incorporated herein by reference for all that it discloses.

BACKGROUND

1. Field

Apparatuses, methods, and computer readable mediums consistent with exemplary embodiments relate to standardizing data from various devices, and more specifically, to integrating data from various devices using an application interface and providing the data for analysis.

2. Description of the Related Art

The use of simulation training is growing rapidly. A simulation training session is a session in which training of personnel is performed through the use of a simulator device that outputs real-time data in response to interactions of the trainees.

In the medical industry, for example, medical training centers conduct simulation training that generally involve students performing simulated medical procedures and/or examinations on a mannequin simulator, which exhibits symptoms of various ailments of a patient during simulated examination sessions. Other types of medical simulators include EKG machines, blood pressure monitors, and virtual reality endoscopic, laparoscopic, and endovascular simulators. During each simulated examination session, which usually takes place in an assigned examination room, the student interacts with the patient during an appointed time period to make a diagnosis of the patient's ailment and to prescribe a proposed treatment plan or perform a procedure. Each examination room is equipped with monitoring equipment, including audio, visual and time recording devices, so that the student's simulated encounter with the patient can be monitored in real time by an evaluator, such as a faculty member or upper class person. Typically, simulation training sessions are also recorded on video for subsequent analysis and teaching purposes. A similar configuration is used in other industries for other types of training sessions.

Also, actual procedures such as a surgery performed in a hospital or an assembly in a manufacturer plant may be recorded by monitoring equipment for further analysis and study.

The monitoring equipment in the examination/practice rooms may include multiple audio/video (A/V) sources, e.g. video cameras, to provide various camera angles of the training session. A typical recording session may have three video feeds, for instance, taken from different camera angles, and one of the video feeds might show a machine that displays data from a simulator, such as EKG, heart rate, or blood pressure data. Also, other monitoring equipment may be used e.g., the ones that receive output from the sensors.

To combine data from different sources (monitoring equipment) for centralized analysis such as quantifiable analysis and management, various analytical applications are developed. For example, U.S. patent application Ser. No. 11/611,792 filed Dec. 15, 2006 by Lucas Huang and Chafic Kazoun titled Synchronous Multi-Media Recording and Playback with End User Control of Time, Data, and Event Visualization for Playback Control Over a Network describes such an analytical application. The disclosure of this application, application Ser. No. 11/611,792 is incorporated herein by reference in its entirety. Accordingly, multiple different data sources and various analytical applications exist for managing the data from these data sources.

Currently within the healthcare IT environment and other environments, users must deal with the complexity of managing multiple analytical systems and data sources for medical events. As explained above, the data needs to be centrally managed but there is no single interchangeable format for all types of devices and no single programming application interface (API) for data exchange between these different analytical systems and data sources.

Healthcare IT companies typically have proprietary API's and sometimes make these selectively available. Furthermore, all the different device manufacturers implement a different mechanism of storing data and few implement a way to exchange data and interact with the devices. These devices sometimes need to be the master driver of a simulation start and end. As such, the devices need to communicate with the analysis application versus the analysis application communicating with the device.

An approach that has been attempted is for the industry to agree on a single standard data format. This has been in the works for years and has not gone anywhere. Different companies cannot agree to use a single format.

Conventionally, there is no way for a device to communicate to an external system in a consistent manner across devices and the data for the different devices is not normalized.

SUMMARY

According to exemplary, non-limiting embodiments, communication between the data sources and the analytical application is established. The entities involved in the communication can have data in different formats. The engine in exemplary, non-limiting embodiments will take the source data from various formats and normalize the data into a universal, standard format.

An aspect of exemplary embodiment is to provide a single flexible API for exchanging data and events. For example, data from various sources is exchanged with the analytical application or other devices using the flexible API. Furthermore, important events are indicated and data is mapped. A mechanism to flexibly add additional devices is provided.

According to an exemplary, non-limiting embodiment, a method is provided in which data is standardized. The method includes receiving data from a device, determining by a computer type of information provided in the received data, converting the information into a predetermined format based on the determined type, and generating a message based on the determined type. The message includes the converted information in the predetermined format. The type of the information is different based on a stage of a process in which the received data was provided.

According to yet another exemplary, non-limiting embodiment, a system for standardizing data is provided. The system includes a receiving unit, which receives data from a device, a determining unit executed by a processor which determines type of information provided in the received data, a conversion unit which converts the information into a predetermined format based on the determined type, and a generation unit which generates a message based on the determined type. The message includes the converted information in the predetermined format. The type of the information is different based on a stage of a process in which the received data was provided.

According to yet another exemplary, non-limiting embodiment, a non-transitory computer readable medium storing instructions executed by a computer for implementing a method of standardizing data. The method includes receiving data from a device, determining type of information provided in the received data, converting the information into a predetermined format based on the determined type, and generating a message based on the determined type. The message includes the converted information in the predetermined format. The type of the information is different based on a stage of a process in which the received data was provided.

BRIEF DESCRIPTION OF THE DRAWINGS

The accompanying drawings, which are incorporated in and constitute a part of this specification exemplify the exemplary embodiments and, together with the description, serve to explain and illustrate exemplary embodiments. Specifically:

FIGS. 5A and 5B are views respectively illustrating a generated report message and a corresponding report output according to an exemplary embodiment.

FIGS. 8A and 8B are a block diagram and a flow chart, respectively, illustrating a report module according to an exemplary embodiment.

DETAILED DESCRIPTION OF EXEMPLARY EMBODIMENTS

Products from B-Line Medical® enhance simulation-based medical training by recording simulation sessions and integrating data from simulators with video recordings and capture of a patient monitor or other XGA source. The simulator data management portion is managed by an integration engine ("Integration Engine") that connects with a range of simulators from numerous manufacturers. Software Development Kit ("SDK") components allow simulator manufacturers to develop robust and reliable integration with products of B-Line Medical by working with a stable, well documented application programming interface ("API").

Figure 1:
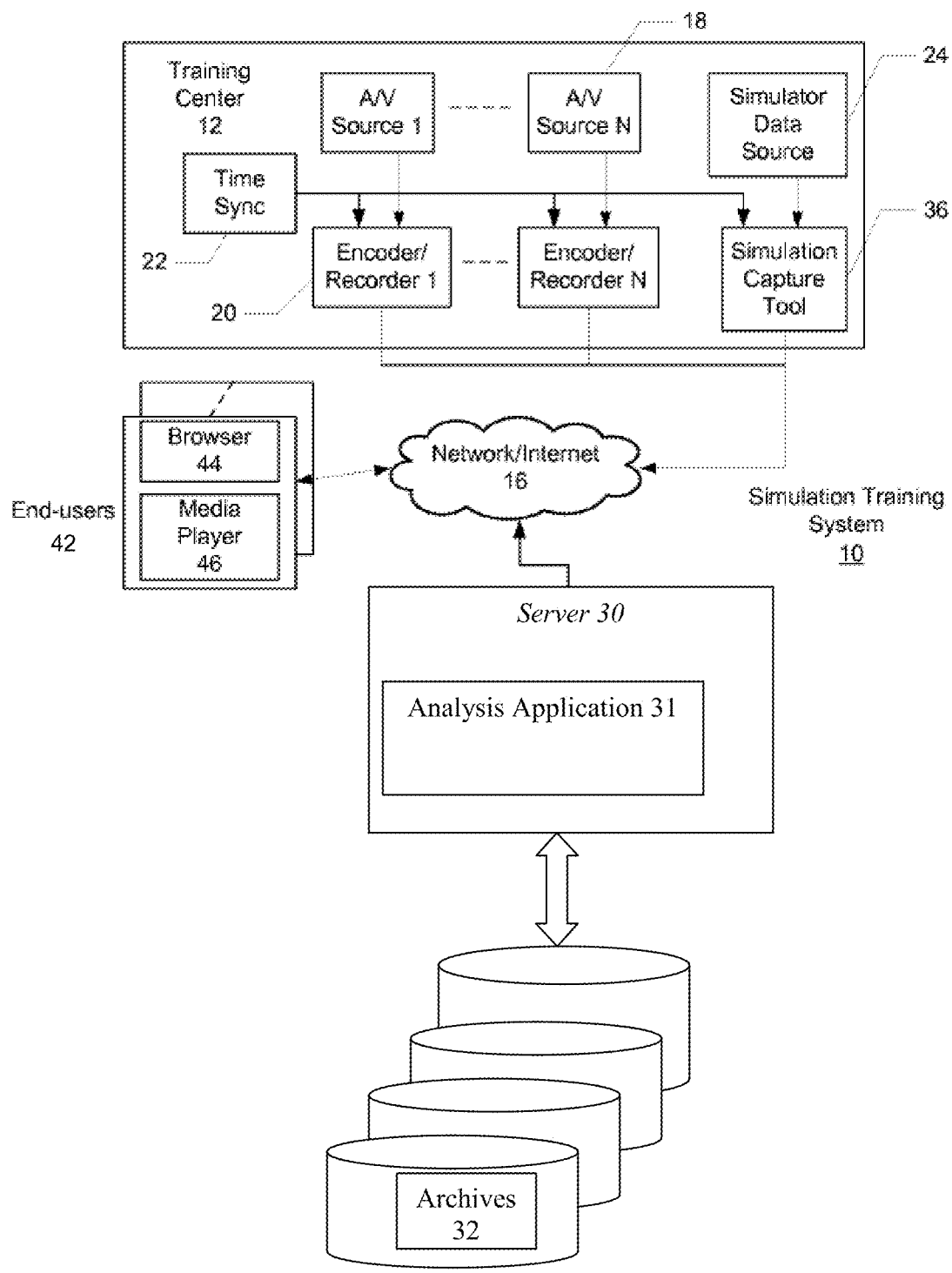
FIG. 1 is a block diagram illustrating a simulation training system according to an exemplary embodiment.

FIG. 1 is a block diagram illustrating a simulation training system in accordance with an exemplary embodiment. An exemplary embodiment provides a web-based simulation training system 10 for providing synchronous multimedia recording and playback of recorded training sessions. The simulation training system 10 includes a training center 12 that has equipment for communicating with an analysis application over a network 16, such as Internet. The training center 12 conducts and records simulation training sessions in one or more training rooms equipped with multiple audio/video (A/V) sources 18, multiple encoder/recorders 20, a time sync generator 22, and a simulator data source 24.

The training sessions are recorded using the A/V sources 18 and the data is sent to respective encoders/recorders 20. The A/V sources 18 in an exemplary embodiment are video cameras, but A/V sources 18 include any type of capture device, such as an auxiliary microphone or a still camera, and the like. The training sessions involve one or more trainees (not shown) who perform simulated procedures, or otherwise interact with, at least one simulator data source 24 that outputs real-time data in response. In an exemplary embodiment, real-time may include actions/events occurring at the current time as well as those that occur within the context of a session. That is to say that the data is not post-processed or collected first, then manipulated after the session is complete.

The type of training conducted by the training center 12 will be described in terms of medical training that would be suitable for doctors, nurses, and emergency response personnel, but the exemplary embodiments are applicable in any type of training that involves the use of any type of simulator and any type of procedures that involve processing of data from various input devices.

Example types of simulator data sources 24 in the medical industry, for instance, include full-body mannequin simulators, virtual reality simulators, EKG machines, and blood pressure monitors, and so on. However, the simulator data source 24 may be a device or a machine used in actual procedure performed in a hospital and not related to training. Also, the simulator data source 24 may be a device unrelated to the medical field e.g., sales training device in a corporate environment or a monitoring device in a security system.

The encoders/recorders 20 and the simulation capture tool 36 may be located remote from the training center, e.g., at the physical location of the server 14.

A server (or a number of servers) 30, which is one or more computers that has a processor such as a CPU and a memory, is provided for running the analysis application 31. The analysis application is software that that may have a skills assessment tool. The skills assessment tool includes a debrief tool and an annotation and assessment tool. The analysis application may be implemented as a custom application that is installed at the training center 12, and accessed directly by clients i.e., end users 42 over a network such as Internet 16.

The analysis application 31 accesses various data stored in databases/archives 32 such as a session data archive, a simulation data archive, and a multimedia archive and so on.

For example, in response to a training session being conducted, the system synchronously records in real-time both simulator data from a simulator data source 24 captured by a simulator capture tool, and video of the training session captured by a plurality of the A/V sources 18. The simulator data may be metric data obtained directly from a simulator or medical equipment e.g., blood pressure of the patient at time t1, heart rate, etc. The simulator data is captured by the simulation capture tool 36. The time sync generator 22 is coupled to the encoders/recorders 20 and to the simulator capture tool 36, to control the synchronization of the recordings.

During the recording, each of the videos captured by A/V sources 18 are encoded as respective digital media files in streaming media format. Streaming media is media that is consumed (heard and/or viewed) while the media is being delivered. The videos captured by the A/V sources 18 may be encoded by the encoders/decoders 20. The simulator data may be captured in its raw and/or compressed format. In another exemplary embodiment, the simulator data can be captured using one of the A/V sources 18 by recording a video of the output of the simulator itself, e.g., by capturing a video of an EKG display. The simulation data may be encoded by the simulation capture tool 36.

During recording of the training session, the simulation data and the digital media files of the video and/or audio feeds are transmitted to the analysis application 31. The simulation data is sent to the analysis application by simulation capture tool 36, where it is stored in the simulation data archive 32 and indexed by an ID of the training session. The video media files are sent to the analysis application 31 by the encoders/decoders and are stored in the multimedia archive 32.

Both the simulator data and a stream of the video media files may be transmitted to the end users 42 over the network 16, such that when the end users 42 receives the simulator data and the stream, the respective videos are synchronously played back with the simulator data on a device of the end user 42 using a browser 44 and a media player 46.

Figure 2:
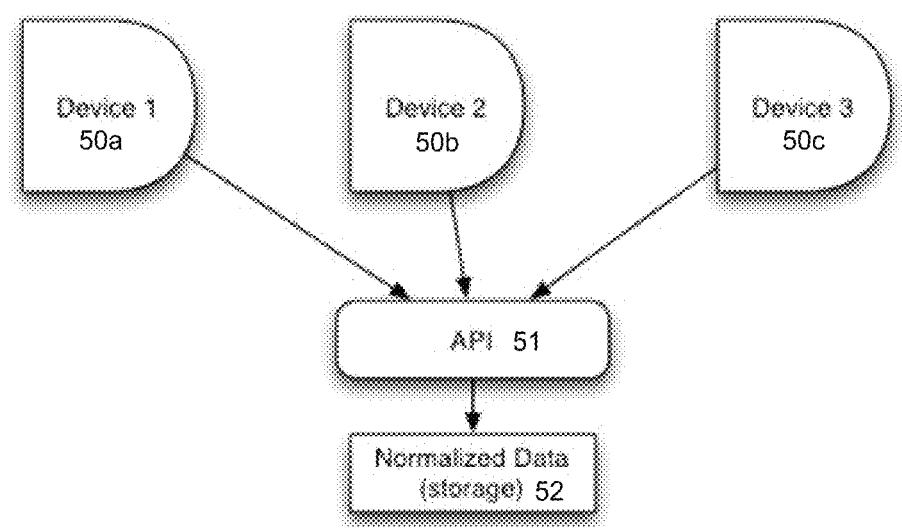
FIG. 2 is a block diagram illustrating a data integration system according to an exemplary embodiment.
Figure 3:
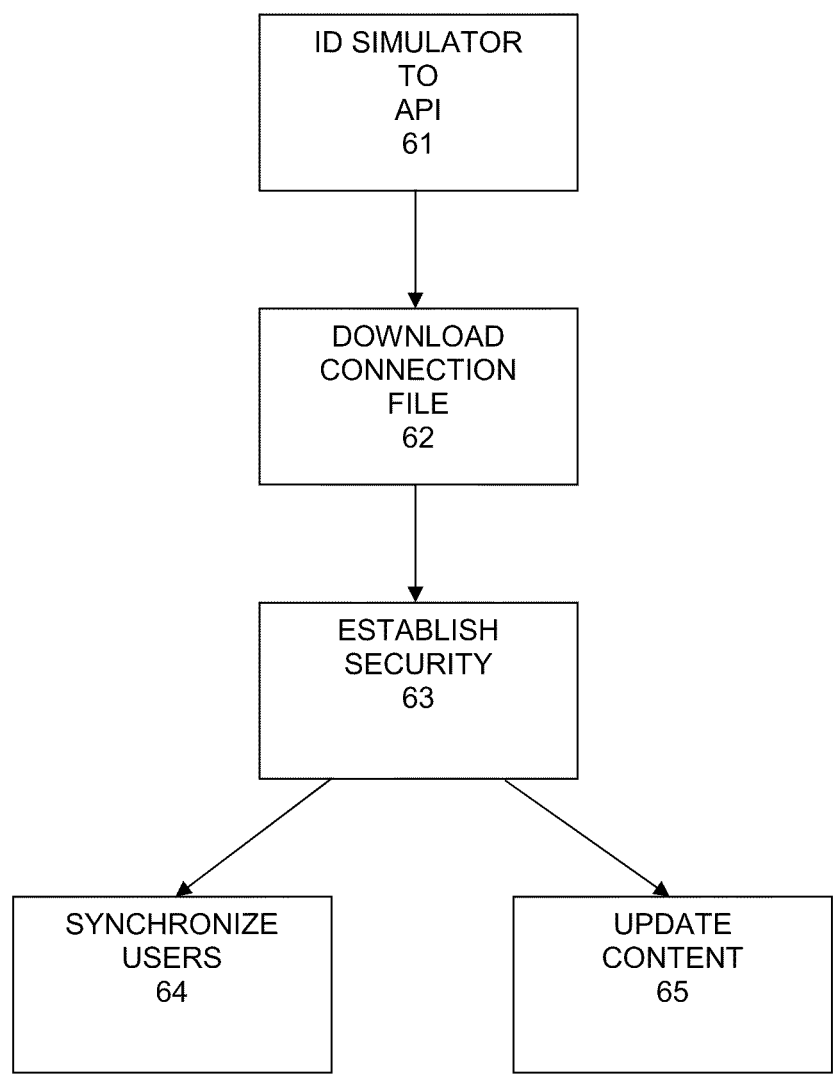
FIG. 3 is a flow chart illustrating configuration of a simulation training system according to an exemplary embodiment.

Each of the A/V sources 18 may be providing data in different formats. Also various simulators 24 have different formats for the data. As illustrated in FIG. 2, various devices 50*a*, 50*b*, and 50*c* provide data in different formats to the API 51, which converts the data to the appropriate format. The data is then processed and normalized and provided to a server for storage in the databases 52.

For example, the simulator data may include physiological statistics that are sent to the database 52 every time a change occurs. The rate at which data is sent to the database is configurable, e.g. once per second, once per millisecond, etc. The change may be transmitted in the form of raw data including numeric values for example "140, 90". The API 51 may process these numbers as being from a device 50*c*, which it identifies as a blood pressure measuring machine. Accordingly, it may then format the raw data into a message format that will include the following attributes: time, sbp=140, dbp=90. The message may then be sent to the storage 52.

Different attributes may be assigned to different physiological statistics. For example, raw data "80" may be received from the device 50*b*. The API 51 will identify the device 50*b* as an oxygen level measuring machine. The raw data 80 may then be converted to a message with the following attributes: time, oxylvl=80%, display="oxygen level at" [oxylvl] "%". That is, one or more additional attributes may provide information regarding how to present the statistics to the user.

An exemplary API provides a stable integration point and an improved user experience. Since the exemplary protocol utilized by the API is specifically designed for integration, it is protected against versioning problems—updates to the protocol are possible as additive only and preserve backwards compatibility. Time synchronization is accomplished as part of the protocol, providing accurate alignment of data elements to video-recorded events. The user experience is easier and simpler, with the user managing only the simulator. The exemplary API is managed behind the scenes, reducing opportunities for user error and the need to train users.

The exemplary API may be used with learner-initiated simulation sessions in which there is no operator viewing and annotating the live session. For a simulator to take advantage of the API, the communication from the simulator to the analysis application is configured. This can be done during integration development. Each simulator is identified during the configuration by the API. A connection data file is then generated that includes a unique ID for the simulator and the connection information to the analysis application.

For example, in order for the simulator to communicate with the API, the following operations may be performed to configure the simulator. In operation 61, the simulator is identified to the API e.g., blood pressure measuring equipment, video recorder, and so on.

In operation 62, a connection file is downloaded to the simulator that provides details on how to connect with the API. Of course, an exemplary connection file may be obtained via other means known in the art. Connection to the analysis application can occur either encrypted or unencrypted. Each simulator must be setup prior to being used. After setting up the simulator, a simulator connection file is downloaded which is an XML file that can be copied to the simulator and provides details on how it would connect to the analysis application. Each connection file contains only a single root element.

Since a simulator can be connected to multiple analysis applications, the simulator should be able to store multiple possible connections and provide a way for the user to choose which analysis application to use.

In operation 63, security is established e.g., an encryption technique is determined such as a hybrid cryptosystem.

In operation 64, the users in the system are synchronized such that when a session is initiated, a shared unique identifier, such as user name, is provided by the simulator to the API that matches a user in the analysis application. The initial user synchronization occurs during the configuration stage. One mechanism to provide a synchronized user list is for the simulator to pull existing users from the analysis application via the API. The reverse is also possible; the simulator can provide a list of users to the API to synchronize in the analysis application. In both mechanisms, a query or filter can be provided to specify a subset of users that should exist in both systems. Another mechanism is through a user directory system such as Lightweight Directory Access Protocol (LDAP) or Active Directory. The API and simulator can independently synchronize with the same user store on the user directory, and thus result in the same user lists.

In operation 65, content updates should be performed during the configuration stage. That is, simulators that maintain training or educational content should send updated content hierarchies to initially populate the analysis application. Subsequent updates will occur whenever that data changes. The analysis application will then use this information to associate its content, i.e. scenarios with specific simulator content, thus providing accurately synchronized content from the simulator. For example, a message may be transmitted to the analysis application that would declare that it is an update message having content elements. Each element will have a reference identifier identifying a particular device and a test attribute that identifies the content being changed to a user.

Figure 4:
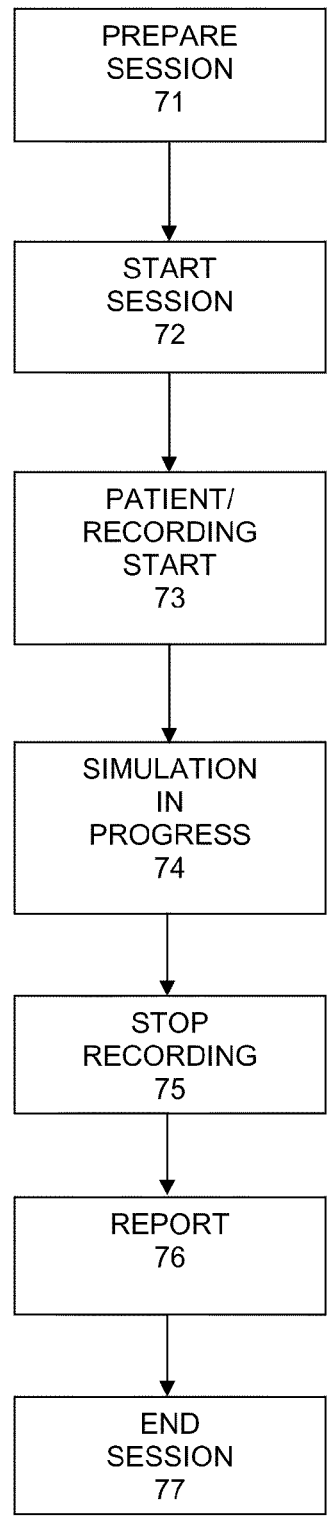
FIG. 4 is a flow chart illustrating communication stages of an exemplary simulation training system according to an exemplary embodiment.

Once the initial configuration is complete, the communication can occur at any point and progresses through the following stages as depicted in exemplary FIG. 4. A standard for identifying these stages and providing any data gathered therein to analysis application is detailed below.

In a first stage, preparation 71, a simulation session is being initiated and necessary setup is performed. For example, the simulator sends an early notification message to the API indicating that a session is about to start. Accordingly, the API may take custom actions based on the type of simulator, the type of scenario being run, etc., which may involve gathering initial statistics of the current state of the simulator, current time, available scenarios, etc., or it may do nothing if no preparation is necessary.

Next, the session is started in stage 72. Specifically, the operator provides information on the session to be run, including user information and simulation content details. For example, user name (login) and case type (content selection) are input.

When a user logs into the simulator, a message in a predetermined format should be sent to the analysis application. The system recognizes that a user logged in and converts the log in information into a predetermined format to be sent to the analysis application. For example, "login" can be the message sent to the analysis application.

When a user chooses which module and case they are going to run (content elements), this indicates the start of the session. The simulator device provides the user identifier, and content element to the analysis application e.g. if user Joe will perform endoscopy on a 45 yrs old male, then predetermined message may contain: Joe; endoscopy; 45 male.

In the next stage 73, recording and patient start occurs. For example, Patient Start indicates the moment the simulated patient's time begins, allowing precise alignment of the simulator, other data, and events. The session is recorded upon receiving a simple message from the simulator device. The recording may start in the middle of the session depending on the content element (scenario). For example, "start" can be the message sent to the analysis application to indicate the start of the recording.

This stage may occur before or after the Start Recording, which is recording of the session using a video camera for example. The Patient Start indicates the start of the user's encounter with the patient and may be provided as a date and time value or as a flag to indicate the start of a counter. That is, in an exemplary embodiment, a counter for a session may be started to synchronize various data sources.

In the next stage, Simulation in Progress 74, events and statistics are collected. This data may be sent in real time or in batches during the session. In an exemplary embodiment, two types of messages are generated, one for the statistics and one for the events.

Statistics include physiological statistics such as heart rate, blood pressure and so on, which were briefly described above. Simulators should provide physiological statistics throughout the simulation if they track or calculate such data. These messages should be sent every time any of the tracked statistics change. The statistics may be provided with the counter attribute. For example, third touch of the heart at twenty minutes after the beginning of the procedure may be the statistic sent in a predetermined format such as 3; heart; 20, to the analysis application.

Events include notable actions by a user. For example, it may include visualizing a polyp, choosing a tool, performing a cutting operation, infusing air, etc. Events may be standardized into an exemplary format that includes time since the patient start stage and identification of an event in a text format for example. Some of additional fields may include: 1) type of event such as a surgery event, a drug event, and a comment; 2) importance of the event e.g., assign a priority to the event; and 3) gradable item, event is correct or not correct. For example, if an event is administering 20 cc of morphine with 200 cc of saline via IV in 20 minutes. The event will then have a time field of 20 minutes, a description such as administer pain medication (type of event may be drug). The event will be provided to the analysis application in this predefined format.

In the next stage 75, the recording is stopped. By way of an example, a simple message may be sent to stop recording e.g. "stop". Typically, this message should be sent before sending the report, but it can be sent any time before the end of the session. Recording will be automatically stopped at the end of the session even if the message is not sent. However, usually, even when the recording is stopped, the session is still open to allow post-session data processing and transmission by the simulator.

Another optional stage is reporting 76. This stage usually takes place after the recording is stopped and can be omitted altogether. During the report 76 stage, transmission of summarized data and images that are not time-specific occurs. For example, the report may include images, individual results, groups, and tables. An individual result may be provided within a table or a group. The individual result may include identification of the result, value, an image, and a grade value (correct or not or a numeric grade). Another individual result may be a summation of a number of events that occurred during the simulation, and so on.

A simulator may provide a report message to the analysis application in a standardized format. This report, however, varies greatly between simulators and by content. Accordingly, the format of a report message is designed to be flexible to handle any data. Reports may consist of a more complex message which allows for grouped as well as tabular results as noted above. The report may include name, group name for results and result data. The result data may be text, images, grades, or some other values. The report will be structured in a predetermined format for various types such as type of a message: report, image result, value, image or report, table, value, column, rows, descriptions, etc.

For example, the format of an unencrypted report message 78a from the simulator according to an exemplary embodiment is depicted in FIG. 5A. Specifically, the report message 78a may include images 78b. Also, the report message 78a may include a number of groups 78c and a table 78d. For example, for the group, a title 78e is provided along with values 78f for each attribute in the group. Also, one or more links to various images may be provided 78g. The table 78d of the report 78a may include a title 78h, column titles 78i, row titles 78j, and values 78k. It is noted that the above-described report message 78a is provided by way of an exemplary only and is not limiting. For example, the report message may include an individual image or just an individual result:

<result text="blood pressure"; Value "100, 50";

corrvalue="1">.

Figure 5B:
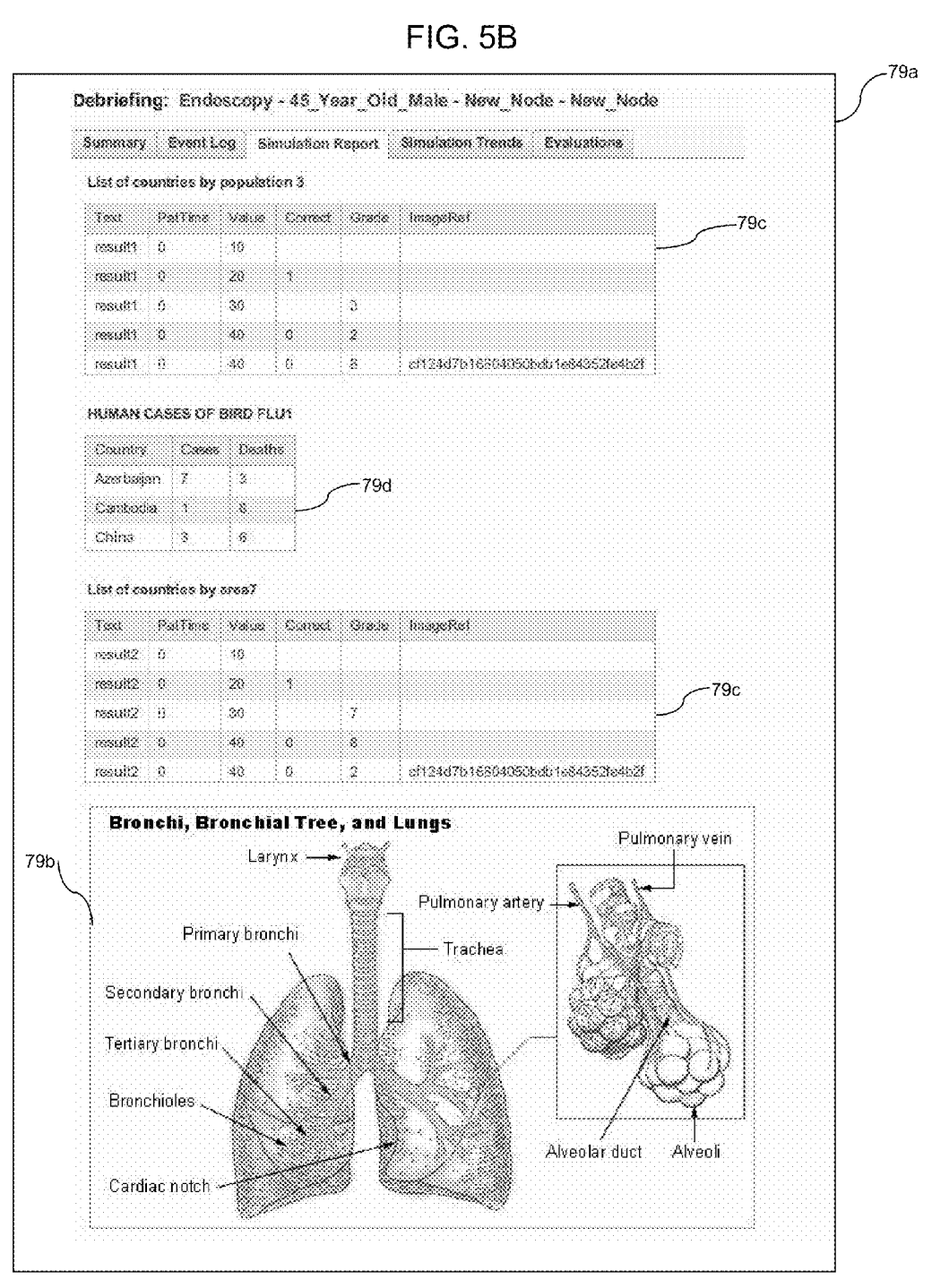

In an exemplary embodiment, the API will analyze the reports message and display the results, as illustrated for example in FIG. 5B. Specifically, the displayed results 79a may include an image 79b, group results 79c and a table 79d. Although in FIG. 5B group results appear in a table format, group results may be provided in different formats such as a list and so on.

In the exemplary embodiment, the report messages such as the one depicted in FIG. 5A may then be encrypted to preserve the security and integrity of the messages being transmitted.

In addition to the reports provided directly by the simulator, the analysis application can also use the event and statistics data to generate session reports that may include a list of events that occurred, e.g., drug administration, or graphs of the statistical data, e.g. heart rate over time. As previously mentioned the time synchronization provides accurate alignment of these data elements to video-recorded events and allows for simultaneous playback of the recorded video with data elements collected from the simulator.

A final stage is End Session 77. End Session 77 indicates that all aspects of the session are complete and all data has been transmitted. If the End Recording stage was skipped, recording is stopped at this time.

In an exemplary embodiment, unless otherwise specified, all messages sent from a simulator to the analysis application can receive a response. For example, the response may be "ok," "warning," or "error." An "ok" message is sent when the message is processed without exception or conflict and is the normal expected response. A warning is sent when the message is processed successfully, but the outcome might not be what the author intended. An error message is sent when the generated messages cannot be accepted by the analysis application or an exception occurs processing a particular message. Besides these responses from a recognized simulator call, it is also possible that an unrecognized, non-standard response will be received in cases where an error is provided by the server directly. This could be caused by various setup problems including invalid address, using the wrong port based on client setup, or the server connection limit is exceeded.

In addition to sending the above messages to the analysis application during a session, in an exemplary embodiment, the simulator may store a copy of all messages in a single local file. Users would be able to upload this file to an analysis application and attach the data to a recorded session. The formation should have a <session> element as its root tag and otherwise would have identical content as the in-session messages mentioned above. In this file, only the root <session> element is required to have a simulator attribute identifying the simulator; it can be left off for all of the other elements.

As discussed above, different simulator and other devices provide data in different formats, which needs to be converted in a standardized format for use by the analysis application.

Figure 6:
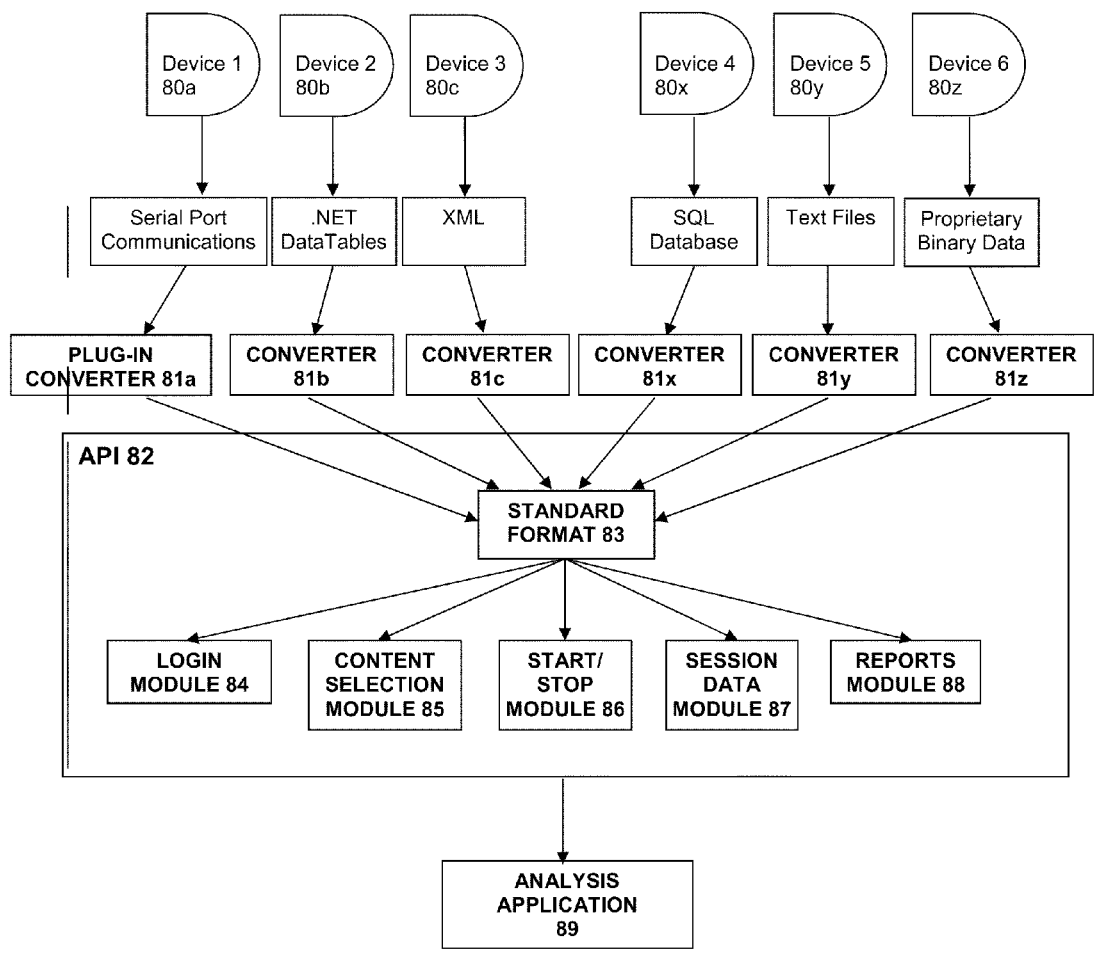
FIG. 6 is a block diagram illustrating another data integration system according to an exemplary embodiment.

FIG. 6 is a block diagram illustrating data integration system according to an exemplary embodiment. The API supports data integration with medical simulators through a data push mechanism initiated by the simulator as shown in FIG. 6. For example, the data from the devices (such as simulators) 80*a* . . . 80*z* (where z is a positive integer) may be recorded without the user interacting with the analysis application 89. That is, the devices 80*a* . . . 80*z* push data to the analysis application 89 and the session is recorded and associated behind the scenes without operator interaction.

The message from the device is converted by a converter 81*a* . . . 81*z* to a standard format recognized by the analysis application 89 and transmitted to the analysis application 89 via the network such as the Internet (not shown).

In particular, various devices use different languages and provide data in various different languages and formats. An exemplary embodiment may include a device that implements its application in the C++ programming language. A single flexible API may be implemented using a .NET solution with a reusable assembly. For the .NET solution to understand exchanged data from the devices, the devices must provide a custom converter that translates its C++ application commands into C#/.NET. Another exemplary embodiment may include a device that implements its application in the C# programming language using the .NET platform. Since this language matches that used in the provided API, no further translation of the message is required and the device may exchange data directly with the API by calling the commands in the API.

For example, a device 80*a* may use a serial port communications protocol and provide its data to a plug-in converter 81*a* for translation. The plug-in converter 81*a* converts data into a standardized format, as described above and detailed below. Device 80*b* may use .NET data tables. The data is provided as .NET Data tables and is converted into a standardized format. A device 80*c* may use XML. Accordingly, the XML data from the device 80*c* is provided to the converter 81*c*. There may be many other devices, and the devices depicted in FIG. 6 are provided by way of an example and not by way of a limitation. A device 80*x* may use an SQL database and provide data in an SQL format to the converter 81*x*, a device 80*y* may use plain text format and provide data in a test file format to the converter 81*y*. Also, a device 80*z* may communicate in proprietary binary data format. Accordingly, converter 81*z* converts the binary data into a standardized format.

Once the data is converted into a standard format, the API determines whether the data is part of a login data, content selection data, start/stop data, session data, or reports data. That is, a respective module is provided to place the standardized data in a respective message.

For example, if the raw data is identified as login information, then the login module 84 may generate a message that would instruct the analysis application 89 to prepare to receive data. In fact, no actual data may be provided but only an instruction to the analysis application 89 to "stand by".

Data may be identified as content selection data that is provided to the content selection module 85. The content selection module 85 will generate a message to the analysis application 89 that may include user name, content reference type and so on. Since the data is provided in the standard format, the content selection module 85 recognizes the data and inserts it into a message it generates.

Data may also be identified as a start stop data that is provided to the start/stop module 86. That is, once the data signals provided by various devices 80*a*-80*z* are converted into a standardized format, it is easy to recognize that the signals should be provided to the start/stop module 86. When the start/stop module receives these signals, it will generate a corresponding message to the analysis application 89. For example, it will generate a message that will request the analysis application to start recording the session or to start the patient counter and so on.

Some data will be data provided during the session i.e., simulation data. Once converted into the standard format, the data is then identified as session data by the standard format module 83 and is provided to the session data module. The session data module 87 generates the proper message and provides the message to the analysis application 89.

Figure 7A:
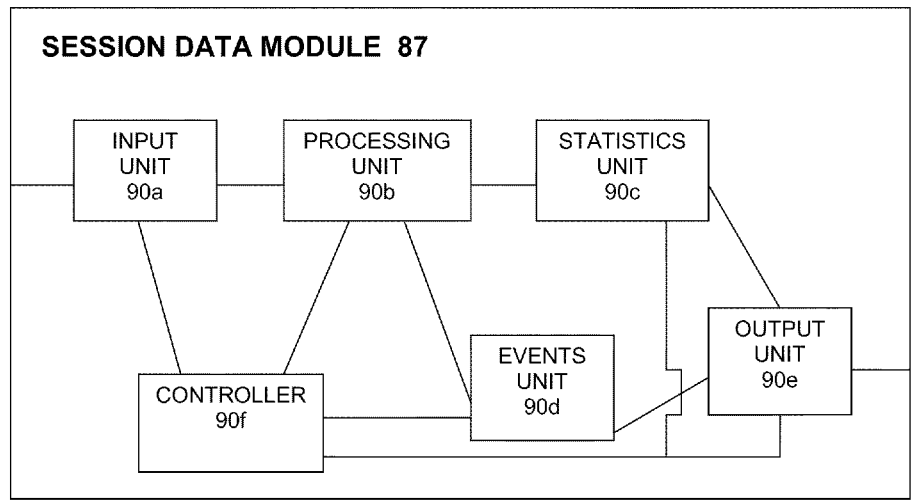
FIGS. 7A and 7B are a block diagram and a flow chart, respectively, illustrating a session data module according to an exemplary embodiment.

For example, FIG. 7A is a block diagram illustrating the session data module 87 according to an exemplary embodiment. The session data module 87 may include an input unit 90*a*, a processing unit 90*b*, a statistics unit 90*c*, an event unit 90*d*, an output unit 90*e*, and a controller 90*f*. That is, the session data module 87 receives data from the standard format module 83 or may be directly from a converter if the standard format module is omitted via an input unit 90*a*. The received data is provided to the processing unit 90*b*. The processing unit 90b is configured to process the data and determine whether the data is a statistics data or an event. If the data is statistics data, it is provided to the statistics unit 90c. The statistics unit 90c accesses a database (not shown) to determine attributes of the provided data e.g., bp=blood pressure, and so on. As a possible variation, the statistics data may include identification of the device 80a . . . 80z, and based on this device type, a respective database may be accessed. This may increase the processing speed of the statistics unit 90c. The statistics unit 90c generates a message for the analysis application 89 and places data into this message. For example, the message may be: output "blood pressure="; [dataA] "." The generated message is then provided to the output unit 90e for transmission to the analysis application 89.

On the other hand, if the processing unit 90b shown in FIG. 7A determines that the data is an event, the data is provided to the events unit 90d. The events unit 90d (similar to the statistics unit 90c) will determine the type of event by accessing one or more databases. Once the type of event is determined, a predetermined message is generated. The generated message may include the retrieved identifier of the event and value, time from the start of the patient, priority of the event, and/or whether it was performed correctly. The generated message is then provided to the output unit 90e for transmission to the analysis application 89.

If the data is identified as not being session data, an error message may be sent to the converter and/or the standard format module. The controller 90f controls the operations of the session data module 87 including the input unit 90a, the processing unit 90b, the statistics unit 90c, the events unit 90d, and the output unit 90e. It may instruct the input unit 90a to receive data or to temporarily stop receipt of data if a backup is detected. Similarly, it may instruct the output unit 90e to output data or to report problems with data receipt, processing, message generation, and/or output.

Figure 7B:
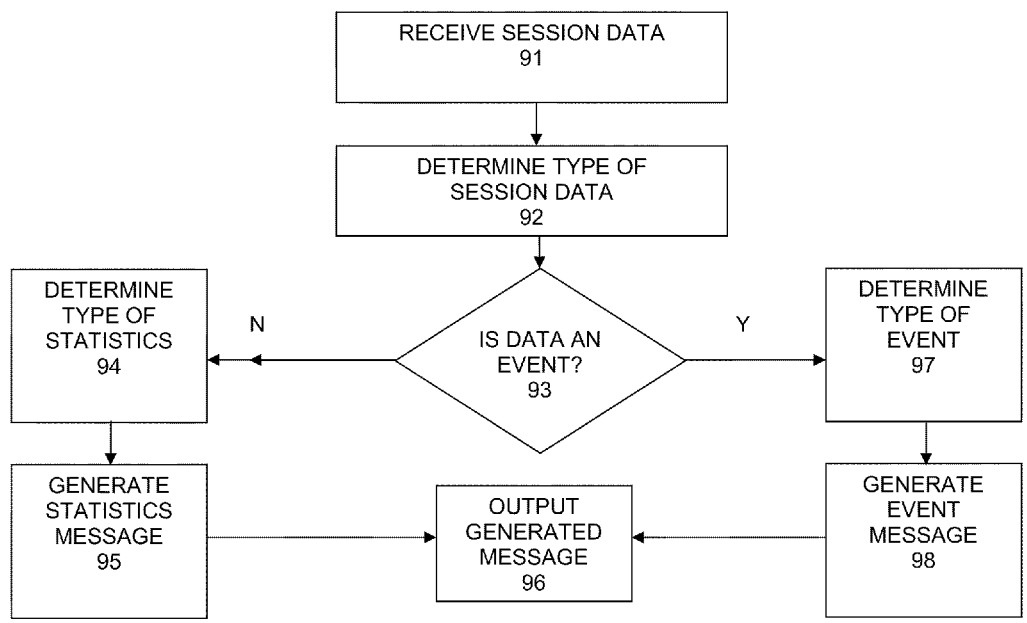

FIG. 7B is a flow chart illustrating operations executed by a session data module 87 according to an exemplary embodiment. In operation 91, session data is received from a standard format module 83. In operation 92, type of session data is determined. That is, the session data module determines whether data is an event or statistics. In operation 93, the session data module checks if the provided data is an event data. If the provided data is not an event data (N in operation 93), the type of statistics data is determined.

For example, the session data module 87 may identify the type of device that provided the data and access a corresponding database to determine type of statistics provided. That is, the statistics data may include "stats, pressure measuring device, 140, 60." The type of device may then be identified as a pressure measuring device, which would mean that the raw data is sbp and dbp. Accordingly, in operation 95, the session data module 87 may generate a message [output: "blood pressure=" [140, 60] "."]

On the other hand, if the statistics data includes "stats, pulse measuring device, 140, 60." The type of "device" may then be identified as a human nurse measuring the pulse of a patient and manually inputting the pulse into her electronic chart, which automatically adds a time value to the input pulse. This may mean that the patient had a pulse of 140 at 60 seconds from the start, for example. Accordingly, in operation 95, the session data module 87 may generate a message [output: "pulse=" [140], at [60] "second from the start of the procedure"] based on the statistics data received from the electronic chart.

The generated message is output to the analysis application, in operation 96.

On the other hand, if the data is identified as an event (93-Y), then the type of event is determined in operation 97. The type of event may be determined based on the identifier of the device 80a . . . 80z or based on the attributes identifying the event. Once event is identified, a corresponding event message may be generated in operation 98. The event message may include description of event with or without a value, time since the patient start, type of event, priority of event, whether it was performed correctly. Next, in operation 96, the message is transmitted to the analysis application 89.

Referring back to FIG. 6, some data will be report data that may be provided after the session is completed. Once converted into the standard format, the data is then identified as reports data by the standard format module 83 and is provided to the reports module 88. The reports module 88 generates the message inserting the received reports data and provides the message to the analysis application 89.

Figure 8A:
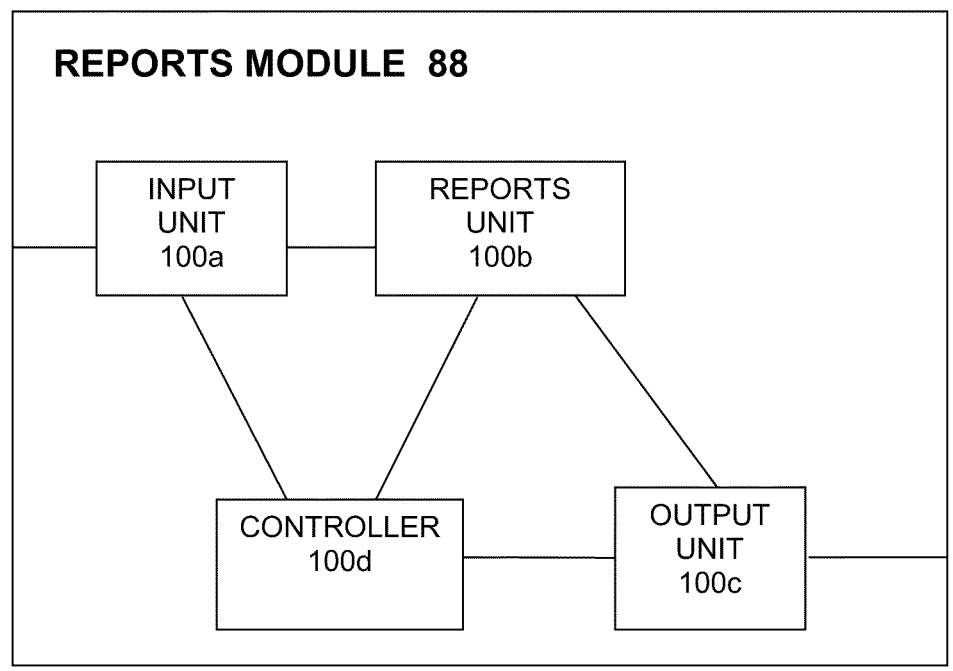

For example, FIG. 8A is a block diagram illustrating the reports module 88 according to an exemplary embodiment. The report module 88 may include an input unit 100a, a reports unit 100b, an output unit 100c, and a controller 100d. That is, the reports module 88 receives data from the standard format module 83 or directly from a converter if the standard format module is omitted via an input unit 100a. The reports unit 100b then determines the attributes of the provided report data e.g., whether it contains group data, table data, individual result and/or images.

If the reports unit 100b determines that the raw data received contains the "group" attribute, then a grouped result will be inserted into the report message. A group result may include one or more individual results. If the reports unit 100b determines that the raw data received contains the "table" attribute, then a tabular result will be inserted into the report message. A table result may include one or more individual results. If the reports unit 100b determines that the raw data received contains the "image" attribute, then the image will be inserted into the report message. It is important to note that more than one instance of each attribute can be contained in the report data and in any order. The collective generated report message is then provided to the output unit 100c for transmission to the analysis application 89.

FIG. 8B is a flow chart illustrating operations executed by a reports module 88 according to an exemplary embodiment. In operation 101, report information is received from a standard format module 83 or a converter. In operation 102, report attributes is determined. That is, the report module 88 determines whether data contains a result and/or an image by parsing the report. In operation 103, the report module checks if the provided information is a result. If the provided data is not a result (N in operation 103), the attribute "image" is determined. Accordingly, the attribute image is inserted into the reports message in operation 104.

On the other hand, if the information is identified as a result (Y in operation 103), then the report module must determine whether the data is tabular or grouped. In operation 105, the report module checks if the provided information is a grouped result. If the provided data is not a grouped result (N in operation 105), the "tabular" attribute is determined. Accordingly, the tabular result is inserted in the reports message in operation 106. If the data is determined to be a grouped result (Y in operation 105), then the grouped result is inserted into the reports message in operation 107.

The reports unit 100b iterates through the report attributes as long as end of the report is not reached (N in operation 108). As noted above, as all the attributes of the report information are determined, the respective data—image 104, tabular result 106, and grouped result 107—is inserted into the reports message. Once the end of the report is reached (Y in operation 108), the collective reports message is generated in operation 109 and output to the analysis application, in operation 110.

Figure 9:
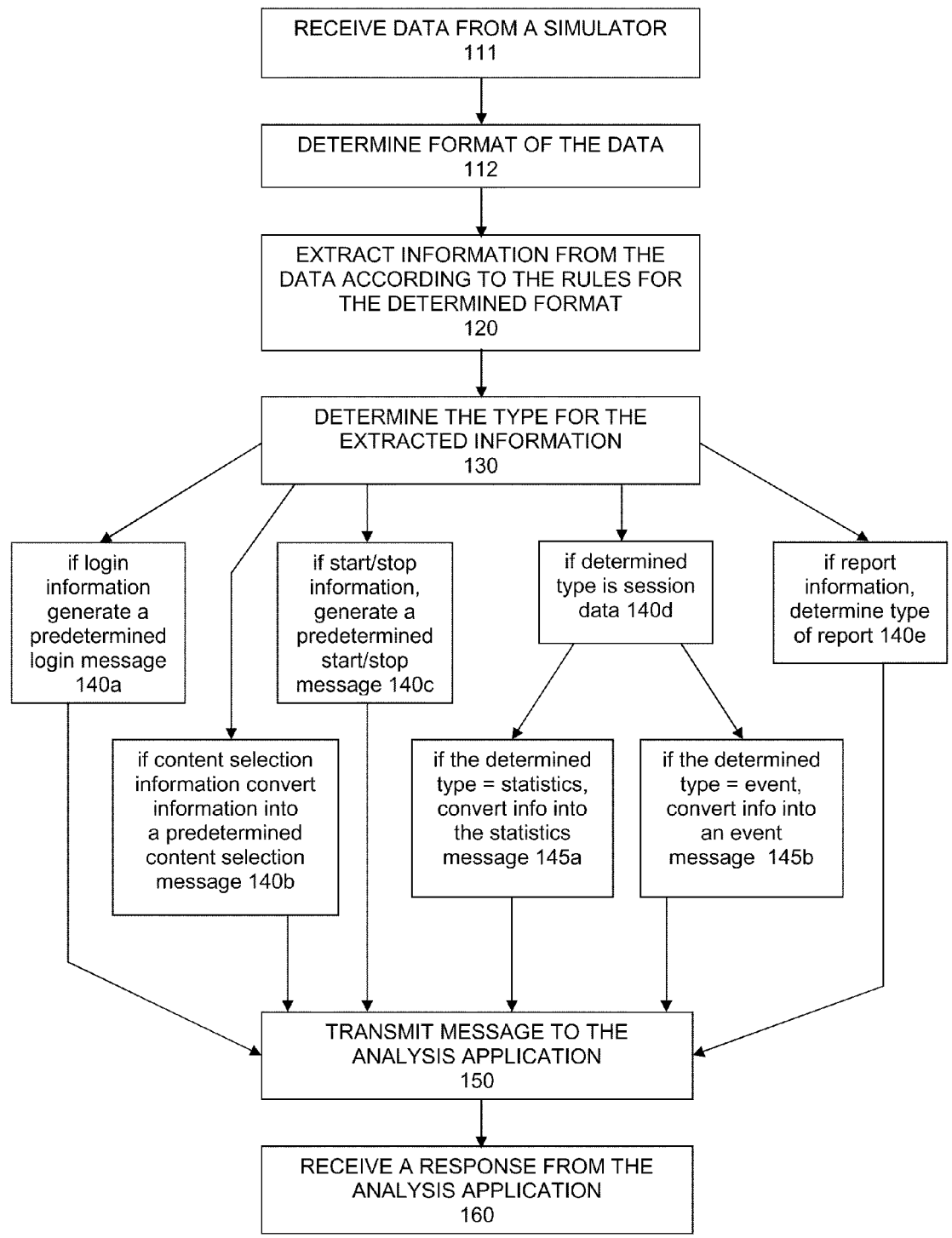
FIG. 9 is a flow chart illustrating operations of a simulation training system according to an exemplary embodiment.

FIG. 9 is a flow chart illustrating operations of a simulation training system according to an exemplary embodiment. In operation 111, data is received from a simulator device. The format of the data is determined based on the type of the simulator device in operation 112. Raw data is extracted according to the rules provided for the determined format in operation 120.

In operation 130, type of the extracted information is determined. For example, if the extracted information is determined to be login information, in operation 140a, a predetermined login message is generated. If the extracted information is determined to be content selection information, a predetermined content selection message is generated in operation 140b and the extracted information is converted or edited and inserted in the message. If the extracted information is determined to be start/stop information, in operation 140c, a predetermined stop/start message is generated. If the extracted information is determined to be session data, in operation 140d, type of session data is determined.

If the determined type of session data is statistics, in operation 145a, the statistics are converted and inserted into a generated statistics message. If the determined type of session data is an event, in operation 145b, the data is converted and inserted into a generated event message.

In operation 150, the generated message is transmitted to the analysis application. In operation 160, the system may receive a response from the analysis application 160, where the response may include whether the message was successfully received and/or parsed or whether an error was encountered.

Although above exemplary embodiments are described in a context of medical industry and training, these are provided by way of an example only. The above exemplary embodiment are applicable to actual medical procedures and may be applied to other fields such as security systems and so on.

An exemplary application program interface (API) such as the one depicted in FIG. 6 may be implemented on a computer-readable medium. The term "computer-readable medium" as used herein refers to any medium that participates in providing instructions to a processor for execution. A computer readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having two or more wires, a portable computer diskette such as a floppy disk or a flexible disk, magnetic tape or any other magnetic medium, a hard disk, a random access memory (RAM), a read-only memory (ROM), an erasable programmable read-only memory (EPROM or Flash memory), a memory card, any other memory chip or cartridge, an optical fiber, a portable compact disc read-only memory (CD-ROM), any other optical medium, punchcards, papertape, any other physical medium with patterns of holes, or any other medium from which a computer can read or suitable combination of the foregoing.

In the context of this document, a computer readable medium may be any tangible, non-transitory medium that can contain, or store a program for use by or in connection with an instruction execution system, apparatus, or device.

Another form is signal medium and may include a propagated data signal with computer readable program code embodied therein, for example, in a base band or as part of a carrier wave. Such a propagated signal may take any of a variety of forms, including, but not limited to, the electromagnetic, optical, or any suitable combination thereof. The signal medium may include coaxial cables, copper wire and fiber optics, including the wires that comprise data bus. The signal medium may be any medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc. or any suitable combination of the foregoing.

Computer program code for carrying out operations for aspects of the exemplary embodiments may be written in any combination of one or more programming languages, including an object oriented programming language such as Java, Smalltalk, C+, .Net or the like and conventional procedural programming languages. The program code may execute entirely on the user's computer, partly on the user's computer, as a stand-alone software package, partly on the user's computer and partly on a remote computer or entirely on the remote computer or server. The remote computer may be connected to the user's computer through any type of network, including a local area network (LAN) or a wide area network (WAN), or the connection may be made to an external computer (for example, through the Internet using an Internet Service Provider).

The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks. Volatile media includes dynamic memory.

Various forms of computer readable media may be involved in carrying one or more sequences of one or more instructions to a processor such as a CPU for execution. For example, the instructions may initially be carried on a magnetic disk from a remote computer. Alternatively, a remote computer can load the instructions into its dynamic memory and send the instructions over a telephone line using a modem. A modem local to a computer system can receive the data on the telephone line and use an infra-red transmitter to convert the data to an infra-red signal. An infra-red detector can receive the data carried in the infra-red signal and appropriate circuitry can place the data on the data bus. The bus carries the data to the volatile storage, from which processor retrieves and executes the instructions. The instructions received by the volatile memory may optionally be stored on persistent storage device either before or after execution by a processor. The instructions may also be downloaded into the computer platform via Internet using a variety of network data communication protocols well known in the art.

The flowchart and block diagrams in the Figures illustrate the architecture, functionality, and operation of possible implementations of systems, methods and computer program products according to various exemplary embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or two blocks may sometimes be executed in the reverse order, depending upon the functionality involved. It will also be noted that each block of the block diagram and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology as used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

The description of the exemplary embodiments has been presented for purposes of illustration and description, but is not intended to be exhaustive or limiting in any form. Many modifications and variations will be apparent to those of ordinary skill in the art without departing from the scope and spirit of the invention. Embodiments were chosen and described in order to explain operations and the practical application, and to enable others of ordinary skill in the art to understand various embodiments with various modifications as are suited to the particular use contemplated. That is, various modifications to these embodiments will be readily apparent to those skilled in the art, and the generic principles and specific examples defined herein may be applied to other embodiments without the use of inventive faculty. For example, some or all of the features of the different embodiments discussed above may be combined into a single embodiment. Conversely, some of the features of a single embodiment discussed above may be deleted from the embodiment. Therefore, the present invention is not intended to be limited to the embodiments described herein but is to be accorded the widest scope as defined by the limitations of the claims and equivalents thereof.

What we claim is:

1. A method of standardizing data obtained in a medical procedure which utilizes a device, the method comprising:
   receiving data from the device, obtained in a session comprising the medical procedure, wherein the session comprises a plurality of stages executed in a predetermined order, the predetermined order comprises a preparation for the medical procedure stage, a log in stage to perform the medical procedure, and a recording stage to record at least one event in the medical procedure;
   determining, by a computer, a type of information provided in the received data, from among a plurality of types of information, based on a stage, from the plurality of stages comprising the preparation for the medical procedure state, the log in stage, the recording stage, and a reporting stage, in which the data is obtained such that based on the stage of the session, attributes of the received data are determined such that at least one attribute from among the attributes is different for different stages;
   determining a format of the determined data;
   parsing the received data based on the determined format to extract information;
   converting the information into a predetermined format based on the determined type;
   generating a message based on the determined type, the message comprising the converted information in the predetermined format; and
   transmitting the generated message for analysis to an external system or storing the generated message for the analysis in a memory,
   wherein the format of the message is predetermined based on whether the type of the extracted information comprises one of: a login type, a content selection type, a timing type, a session type, and a reports type,
   wherein for each of a plurality of types comprising the login type, the content selection type, the timing type, the session type, and the reports type, generating the message in a respectively, distinct format,
   wherein the device comprises at least one of a medical simulator and a medical device,
   wherein the determining, the converting, and the generating are executed in real-time, and
   wherein the format of the received data varies based on a type of the device, a communication protocol which transmitted the received data from the device, and a programming language in which the received data is encoded.

2. The method of claim 1, wherein, during the recording stage, a first device is an equipment that gathers data in at least one of a text and an image formats and a second device gathers data in at least one of an audio and video formats.

3. The method of claim 1, wherein types of the extracted information comprise login information, content selection information, timing information, session information, and report information and wherein, in response to the determined type of the extracted information being said session information, determining whether the session information is statistics or an event.

4. The method of claim 3, wherein, in response to the determined session data being said statistics, determining type of statistics based on identification of the device or based on the session information,
   wherein the statistics comprise a parameter identifying the type of the device, a parameter identifying the session data to be the statistics, and at least two parameters identifying output values of the device.

5. The method of claim 3, wherein, in response to the determined session data being said event, determining type of event based on at least one of identification of the device and the session information,
   wherein the determining comprises parsing raw data received to extract a plurality of values comprising at least two of: indicating identification of event, timing of the event, ranking of an event, and a grade for an event; and
   wherein, in response to the determined session data being said event, the generated message comprises at least two of the following fields: identification of event, timing information, type of event, importance of event, and a grading attribute, which values are set based on the extracted corresponding value from the raw data.

6. The method of claim 3, wherein, in response to the determined type of the extracted information being the reports type, the generating of the message comprises summarized data and images organized into at least one of a table and a group.

7. A system for standardizing data obtained in a medical procedure which utilizes a device, the system comprising:
   a receiver, which is configured to receive data from the device obtained in a session comprising the medical procedure, wherein the session comprises a plurality of stages executed in a predetermined order, the predetermined order comprises a preparation for the medical procedure stage, a log in stage to perform the medical procedure, and a recording stage to record at least one event in the medical procedure;
   a determiner, executed by a processor, which is configured to determine a type of information provided in the received data, from among a plurality of types of information, based on a stage, from the plurality of stages comprising the preparation for the medical procedure stage, the login stage, the recording stage, and a reporting stage, in which the data is obtained such that based on the stage of the session, attributes of the received data are determined such that at least one attribute from among the attributes is different for different stages;
   a formatter which determines format of the received data;
   a parser which parses the received data based on the determined format to extract information;
   a converter which is configured to convert the information into a predetermined format based on the determined type;
   a generator which is configured to generate a message based on the determined type, the message comprising the converted information in the predetermined format; and
   a transmitter, which transmits the generated message for analysis to an external system or a memory which stores the generated message for the analysis in a memory,
   wherein the format of the message is predetermined based on whether the type of the extracted information comprises one of: a login type, a content selection type, a timing type, a session type, and a reports type,
   wherein for each of a plurality of types comprising the login type, the content selection type, the timing type, the session type, and the reports type, generating the message in a respectively, distinct format,
   wherein the device comprises at least one of a medical simulator and a medical device,
   wherein operations of the determiner, converter, and generator are executed in real-time, and
   wherein the format of the received data varies based on at least one of: type of the device, communication protocol which transmitted the received data from the device, and programming language in which the received data is encoded.

8. The system of claim 7, wherein the device is an equipment that gathers data in a text, image, audio, or video format.

9. The system of claim 7, wherein, in response to the determined type of the extracted information by the determiner being said session type, determining whether session information is statistics or an event.

10. The system of claim 9, wherein, in response to the determiner determining that the session information is said statistics, determining, by the determiner, type of statistics based on an identification of the device or based on the session information.

11. The system of claim 9, wherein, in response to the determiner determining that the session information is said event, determining, by the determiner, type of event based on at least one of an identification of the device and the session information and wherein, in response to the determined session information being said event, the generated message comprises at least two of the following fields: an identification of event, timing information, a type of event, an importance of event, and a grading attribute.

12. The system of claim 9, wherein, in response to the determiner determining that the type of the extracted information is said reports type, the generator generates the message comprising summarized data and images organized into at least one of a table and a group.

13. A non-transitory computer readable medium storing instructions executed by a computer for implementing a method of standardizing data obtained in a medical procedure which utilizes a device, the method comprising:
   receiving data from the device obtained in a session comprising the medical procedure, wherein the session comprises a plurality of stages executed in a predetermined order, the predetermined order comprises a preparation for the medical procedure stage, a log in stage to perform the medical procedure, and a recording stage to record at least one event in the medical procedure;
   determining a type of information provided in the received data, from among a plurality of types of information, based on a stage, from the plurality of stages comprising the preparation for the medical procedure stage, the log in stage, the recording stage, and a reporting stage, in which the data is obtained such that based on the stage of the session, attributes of the received data are determined such that at least one attribute from among the attributes is different for different stages from among the plurality of stages;
   determining a format of the determined data;
   parsing the received data based on the determined format to extract information;
   converting the information into a predetermined format based on the determined type;
   generating a message based on the determined type, the message comprising the converted information in the predetermined format; and
   transmitting the generated message for analysis to an external system or storing the generated message for the analysis in a memory,
   wherein the format of the message is predetermined based on whether the type of the information comprises one of: a login type, a content selection type, a timing type, a session type, and a reports type,
   wherein for each of a plurality of types comprising the login type, the content selection type, the timing type, the session type, and the reports type, generating the message in a respectively, distinct format,
   wherein the device comprises at least one of a medical simulator and a medical device,
   wherein the determining, the converting, and the generating are executed in real-time, and
   wherein the format of the received data varies based on a type of the device, a communication protocol which transmitted the received data from the device, and a programming language in which the received data is encoded.

14. The method of claim 1, wherein the reporting stage comprises data obtained in post medical procedure encounters and wherein in the recording stage, a simulation is in progress and events are obtained comprising actions by a user performing the medical procedure, and wherein, in the recording stage, statistics comprising physiological states of an entity being treated are gathered.

15. A method of standardizing data obtained in a medical procedure which utilizes a device, the method comprising:
receiving data obtained in relation to the medical procedure from the device;
determining, by a computer, a type of information provided in the received data, from among a plurality of types of information, based on a stage of a process in the medical procedure from among a plurality of stages comprising a preparation for the medical procedure stage, a log in stage, a recording stage, and a reporting stage, such that based on the stage of the session, attributes of the received data are determined wherein at least one attribute from among the attributes is different for different stages;
determining a format of the determined data;
parsing the received data based on the determined format to extract information;
converting the information into a predetermined format based on the determined type, wherein the predetermined format is a standardized format;
generating a message based on the determined type, the message comprising the converted information in the predetermined format; and
transmitting the generated message for analysis to an external system or storing the generated message for the analysis in a memory,
wherein the format of the message is predetermined based on whether the type of the information is one of a login type, a content selection type, a timing type, a session type, and a reports type,
wherein for each of a plurality of types comprising the login type, the content selection type, the timing type, the session type, and the reports type, generating the message in a respectively, distinct format,
wherein the device comprises at least one of a medical simulator and a medical device,
wherein the determining, the converting, and the generating are executed in real-time, and
wherein the format of the received data varies based on a type of the device, a communication protocol which transmitted the received data from the device, and a programming language in which the received data is encoded.

16. The method of claim 15, further comprising downloading a uniquely generated connection file to the device, which comprises the destination where the generated message is to be provided.

17. The method of claim 15, wherein the connection file is executed prior to the receiving data obtained in relation to the medical procedure from the device.

18. The method of claim 15, wherein an identifier of the device is provided to the destination to set up a connection with the device prior to the receiving the data obtained in relation to medical procedure.

19. A non-transitory computer readable medium storing an application programming interface (API) which is executed by a computer and which integrates data obtained during a medical procedure which utilizes a device, the API comprising:
a receiver which receives from the device data obtained in a session comprising the medical procedure converted into a predetermined format for the API, wherein the session comprises a plurality of stages executed in a predetermined order, the predetermined order comprises a preparation for the medical procedure stage, a log in stage to perform the medical procedure, and a recording stage to record at least one event in the medical procedure;
a determiner which determines type of the received data based on a stage from the plurality of stages comprising the preparation for the medical procedure stage, the log in stage, the recording stage, and a reporting stage, in which the data is obtained and based on the stage of the session, attributes of the received data are determined such that at least one attribute from among the attributes is different for different stages from among the plurality of stages;
a formatter which determines format of the received data;
a parser which parses the received data based on the determined format to extract information;
a generator which generates a custom message to an analysis application based on the determined type of the received data; and
a transmitter, which transmits the generated message for analysis to an external system or a memory which stores the generated message for the analysis in a memory,
wherein the determiner is configured to: determine a type of a device based on information in the received data, request a format of the received data from a remote source by providing the determined type of the device, and receive the requested format which comprises an identifier for each element in the received data so that the received data is parsed based on the identifier for said each element;
wherein the generator generates the custom message comprising a field for each of at least two elements in the received data identified by the determiner,
wherein the device comprises at least one of a medical simulator and a medical device,
wherein operations of the determiner, converter, and generator are executed in real-time, and
wherein the format of the received data varies based on at least one of: type of the device, communication protocol which transmitted the received data from the device, and programming language in which the received data is encoded.

20. The non-transitory computer readable medium of claim 19, wherein the device is the medical simulator and wherein the generator comprises a login generator which generates a message comprising login information, a content selection generator which generates a message comprising selected content includes scenario information, timing generator which generates a message comprising timing information, and report generator which generates a message comprising report information.

21. The non-transitory computer readable medium of claim 20, wherein the API further comprises a session generator which generates a message comprising session data, wherein the session generator determines whether the session information is statistics or an event and generates different message based on the determination.

22. The non-transitory computer readable medium of claim 21, wherein, in response to the session generator determining that session data is said statistics, determining type of statistics based on identification of the device or based on the session information.

23. The non-transitory computer readable medium of claim 21, wherein, in response to the session generator determining that the session data is said event, determining type of event based on at least one of identification of the device and the session information and wherein in response to the determined session data by said session generator being said event, the generated message comprises at least two of the following fields: identification of event, timing information, type of event, importance of event, and a grading attribute.

24. The non-transitory computer readable medium of claim 20, wherein if the determiner determines that the type of the data is said report information, the report generator generates a message comprising summarized data and images organized into at least one of a table or a group.

25. The non-transitory computer readable medium of claim 20, wherein the API integrates with a plurality of different types of devices using a learner-initiated simulation session and a connection file generated based on the learner-initiated simulation session.

26. The non-transitory computer readable medium of claim 19, wherein the API further comprises a command generator, which generates commands to the medical simulator.

27. The non-transitory computer readable medium of claim 19, wherein the receiver receiving data from an equipment that gathers data in a text, image, audio, or video format, wherein the device is the medical simulator, and wherein the determiner determines type of the received data based on said determining the stage of the session in which the received data was generated and attributes of the received data generated in the stage.

28. The non-transitory computer readable medium of claim 19, wherein the device gathers data in a text, image, audio, or video format.

29. The non-transitory computer readable medium of claim 19, wherein in the reporting stage, data obtained in post medical procedure encounters is recorded, wherein, in the recording stage, a simulation is in progress and the events comprise actions by a user performing the medical procedure, and wherein, in the recording stage, statistics comprising physiological statistics of an entity being treated are gathered.

30. The non-transitory computer readable medium of claim 19, wherein:
in response to the stage being the preparation stage, the determiner determines that the type of data relates to a unique identifier of a user;
in response to the stage being the log in stage, the determiner determines that the type of data relates to a login and case type information; and
in response to the stage being the recording stage, the determiner determines whether the type of data relates to a physiological response in response to user action.

31. A non-transitory computer readable medium storing an application programming interface (API) which is executed by a computer and which integrates data obtained during a medical procedure which utilizes a device, the API comprising:
a receiver which receives data obtained in relation to the medical procedure from the device converted into a predetermined format for the API;
a determiner which determines type of the received data based on a stage of a process and a type of the device, wherein the predetermined format is a standardized format;
a formatter which determines format of the received data;
a parser which parses the received data based on the determined format to extract information;
a generator for each respective type of data, which generates a custom message to an analysis application based on the determined type of data; and
a transmitter, which transmits the generated message for analysis to an external system or a memory which stores the generated message for the analysis in a memory,
wherein the format of the custom message is predetermined by the generator based on whether the type of the information comprises one of a login type, a content selection type, a timing type, a session type, and a reports type,
wherein for each of types of the information comprising the login type, the content selection type, the timing type, the session type, and the reports type, the generator generates the message in a respectively, distinct format,
wherein the device comprises at least one of a medical simulator and a medical device,
wherein operations of the determiner and generator are executed in real-time, and
wherein the format of the received data varies based on at least one of: type of the device, communication protocol which transmitted the received data from the device, and programming language in which the received data is encoded.

* * * * *